United States Patent
Abhigyan et al.

(10) Patent No.: US 10,616,321 B2
(45) Date of Patent: Apr. 7, 2020

(54) DISTRIBUTED STATEFUL LOAD BALANCER

(71) Applicant: AT&T Intellectual Property I, L.P., Atlanta, GA (US)

(72) Inventors: Abhigyan, Somerset, NJ (US); Kaustubh Joshi, Scotch Plains, NJ (US); Edward Daniels, Wadsworth, OH (US); Han Nguyen, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/851,910

(22) Filed: Dec. 22, 2017

(65) Prior Publication Data

US 2019/0199789 A1 Jun. 27, 2019

(51) Int. Cl.
*H04L 29/08* (2006.01)
*H04L 12/743* (2013.01)

(52) U.S. Cl.
CPC ...... *H04L 67/1029* (2013.01); *H04L 45/7453* (2013.01); *H04L 67/1031* (2013.01); *H04L 67/1038* (2013.01); *H04L 67/2842* (2013.01)

(58) Field of Classification Search
CPC .................................................. H04L 67/1029
USPC .......................................................... 370/392
See application file for complete search history.

(56) References Cited

U.S. PATENT DOCUMENTS

| | | | |
|---|---|---|---|
| 7,747,754 B2 | 6/2010 | Kaluskar et al. | |
| 7,870,265 B2 | 1/2011 | Kramer et al. | |
| 8,755,283 B2 | 6/2014 | Patel et al. | |
| 8,825,867 B2 | 9/2014 | Arisoylu et al. | |
| 8,848,536 B2 | 9/2014 | Hu et al. | |
| 8,850,002 B1 | 9/2014 | Dickinson et al. | |
| 8,908,521 B2 | 12/2014 | Dyke et al. | |
| 9,083,710 B1* | 7/2015 | Yadav | H04L 67/1004 |

(Continued)

FOREIGN PATENT DOCUMENTS

WO WO 2016/119877 8/2016
WO WO 2017/167385 10/2017

OTHER PUBLICATIONS

Stoica, Ion; Morris, Robert; Karger, David; Kaashoek, M. Frans; Balakrishnan, Hari; Chord: A Scalable Peer-to-peer Lookup Service for Internet Applications (Year: 2001).*

(Continued)

*Primary Examiner* — Peter G Solinsky
(74) *Attorney, Agent, or Firm* — Hartman & Citrin LLC

(57) ABSTRACT

Concepts and technologies are disclosed herein for a distributed stateful load balancer. A first load balancer can store a first portion of a distributed hash table including data over a first range of hash keys. The first load balancer can be in communication with a second load balancer that stores a second portion of the distributed hash table including data over a second range of hash keys. The first load balancer can receive a packet, where a hash value calculated for the packet does not fall in the first range of hash keys. The first load balancer can identify, based on the hash value, that the second load balancer stores data that identifies a path associated with the packet and query the second load balancer to identify the path. The first load balancer can receive the data and forward, along the path, the packet to a network element.

20 Claims, 12 Drawing Sheets

(56) References Cited

U.S. PATENT DOCUMENTS

| | | | |
|---|---|---|---|
| 9,203,703 | B2 | 12/2015 | Koponen et al. |
| 9,294,408 | B1 | 3/2016 | Dickinson et al. |
| 9,426,220 | B2 | 8/2016 | Chauhan et al. |
| 9,553,809 | B2 | 1/2017 | Sorenson, III et al. |
| 9,596,305 | B2 | 3/2017 | Chauhan et al. |
| 9,602,404 | B2 | 3/2017 | Koponen et al. |
| 9,619,542 | B2 | 4/2017 | Kamath et al. |
| 9,697,033 | B2 | 7/2017 | Koponen et al. |
| 9,729,444 | B2 | 8/2017 | Wells |
| 9,749,430 | B2 | 8/2017 | Nano et al. |
| 9,755,960 | B2 | 9/2017 | Moisand et al. |
| 9,760,370 | B2 | 9/2017 | Forsberg et al. |
| 2004/0131059 | A1 | 7/2004 | Ayyakad et al. |
| 2007/0297410 | A1* | 12/2007 | Yoon ................ H04L 63/0227 370/392 |
| 2008/0123664 | A1* | 5/2008 | Schwan ............. H04L 67/104 370/395.32 |
| 2015/0189009 | A1 | 7/2015 | van Bemmel |
| 2016/0094456 | A1* | 3/2016 | Jain .................. H04L 41/0813 370/235 |
| 2016/0156708 | A1 | 6/2016 | Jalan et al. |
| 2016/0164780 | A1 | 6/2016 | Timmons et al. |
| 2017/0026294 | A1 | 1/2017 | Basavaraja et al. |
| 2017/0085486 | A1 | 3/2017 | Chung |
| 2017/0126812 | A1 | 5/2017 | Singhal |
| 2019/0037044 | A1* | 1/2019 | Zhu .................... H04L 67/2842 |

OTHER PUBLICATIONS

Ramakanth Kumar P, Deepamala N, Design for Implementing NetFlow using existing Session Tables in devices like Stateful Inspection Firewalls and Load Balancers (Year: 2010).*

Colajanni et al., "A Parallel Architecture for Stateful Intrusion Detection in High Traffic Networks," Proceedings of the IEEE/IST Workshop on Monitoring, Attack Detection and Mitigation, Sep. 28-29, 2006.

Bestavros et al., "Distributed Packet Rewriting and its Application to Scalable Server Architectures," Proceedings of the Sixth International Conference on Network Protocols, Oct. 13-16, 1998, pp. 290-297, IEEE 1998.

Sherry et al., "Making Middleboxes Someone Else's Problem: Network Processing as a Cloud Service," ACM SIGCOMM, Aug. 13-17, 2012, ACM 2012.

Yi et al., "A case for stateful forwarding plane," Computer Communications 36.7, Jan. 29, 2013, pp. 779-791.

* cited by examiner

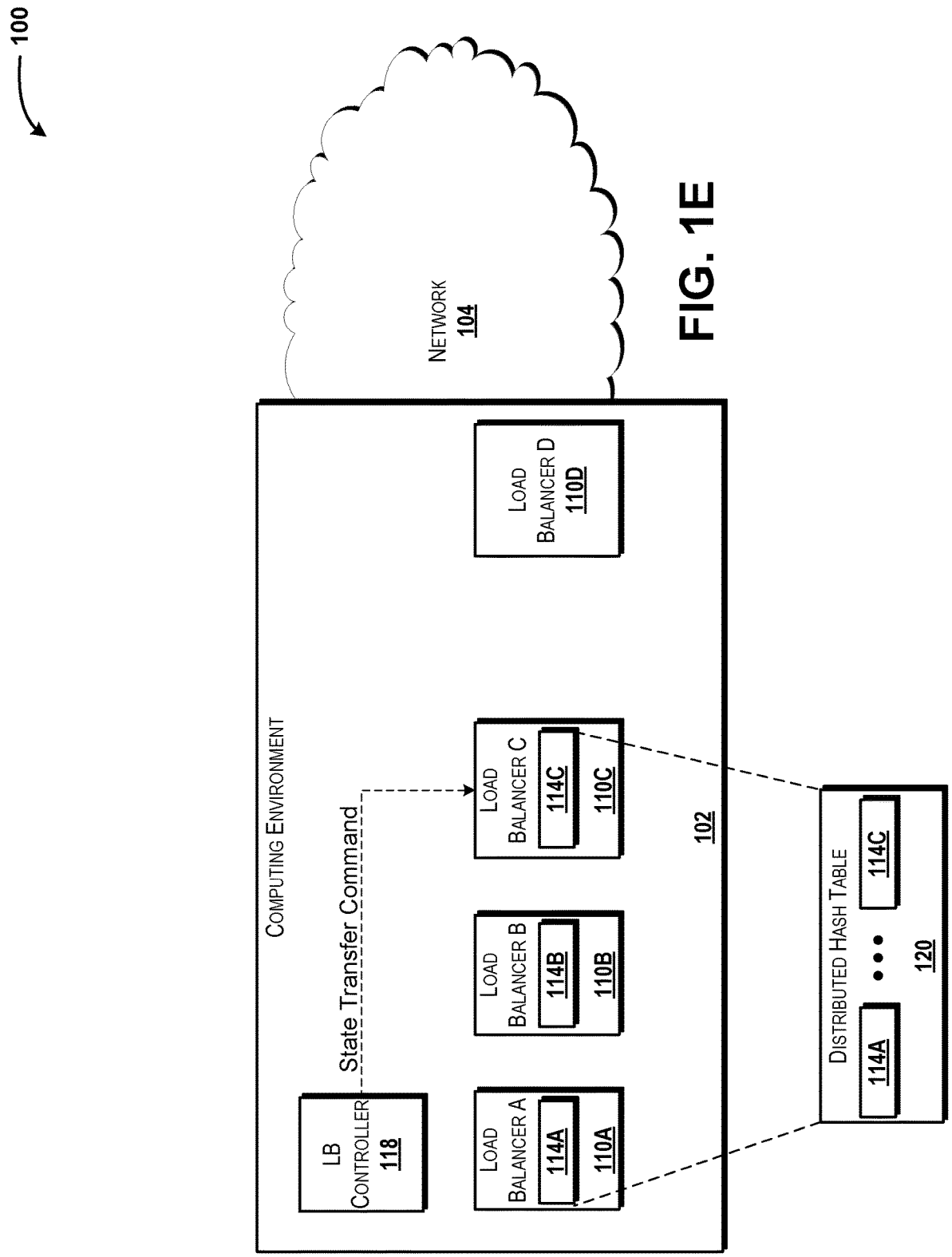

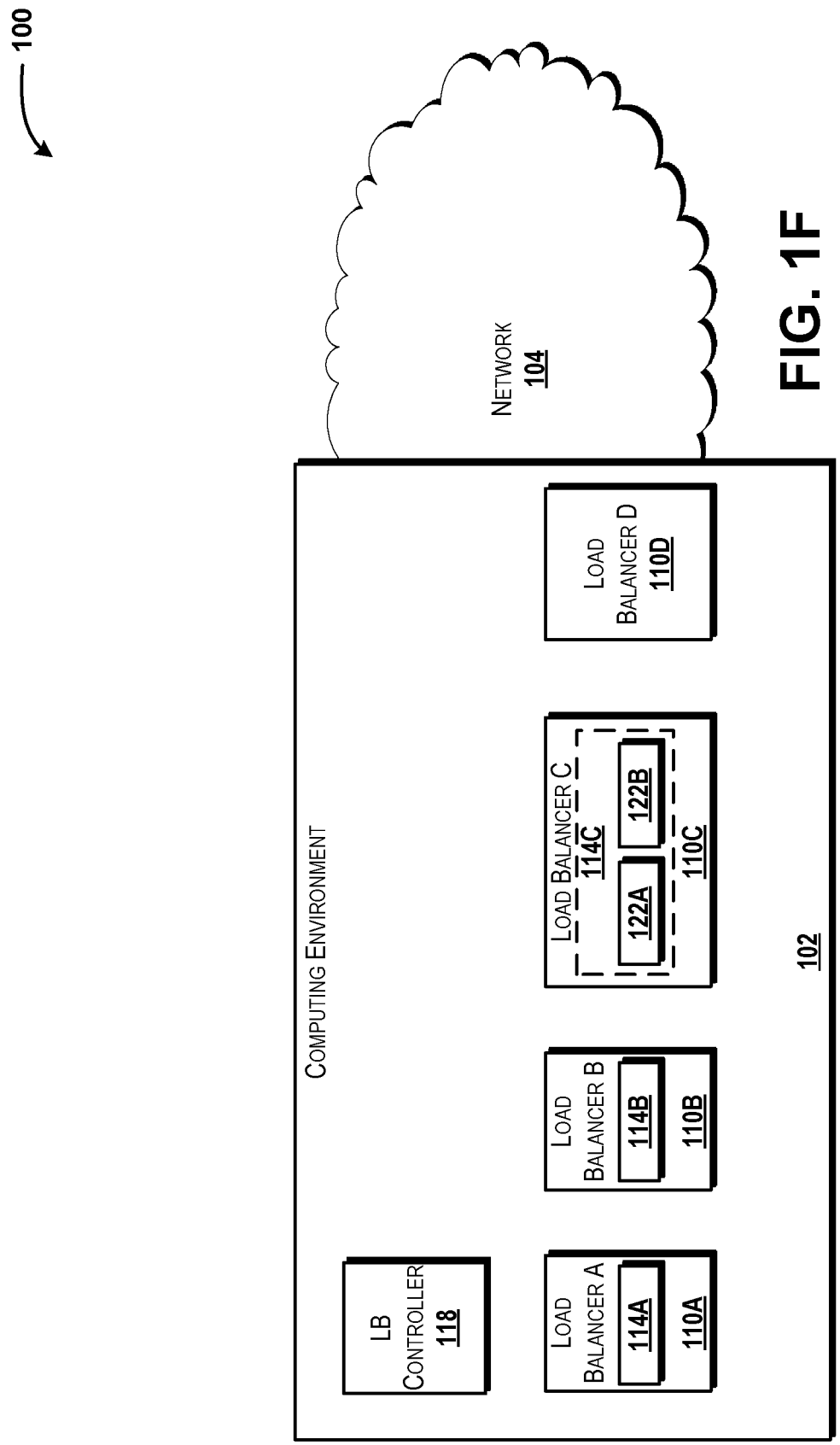

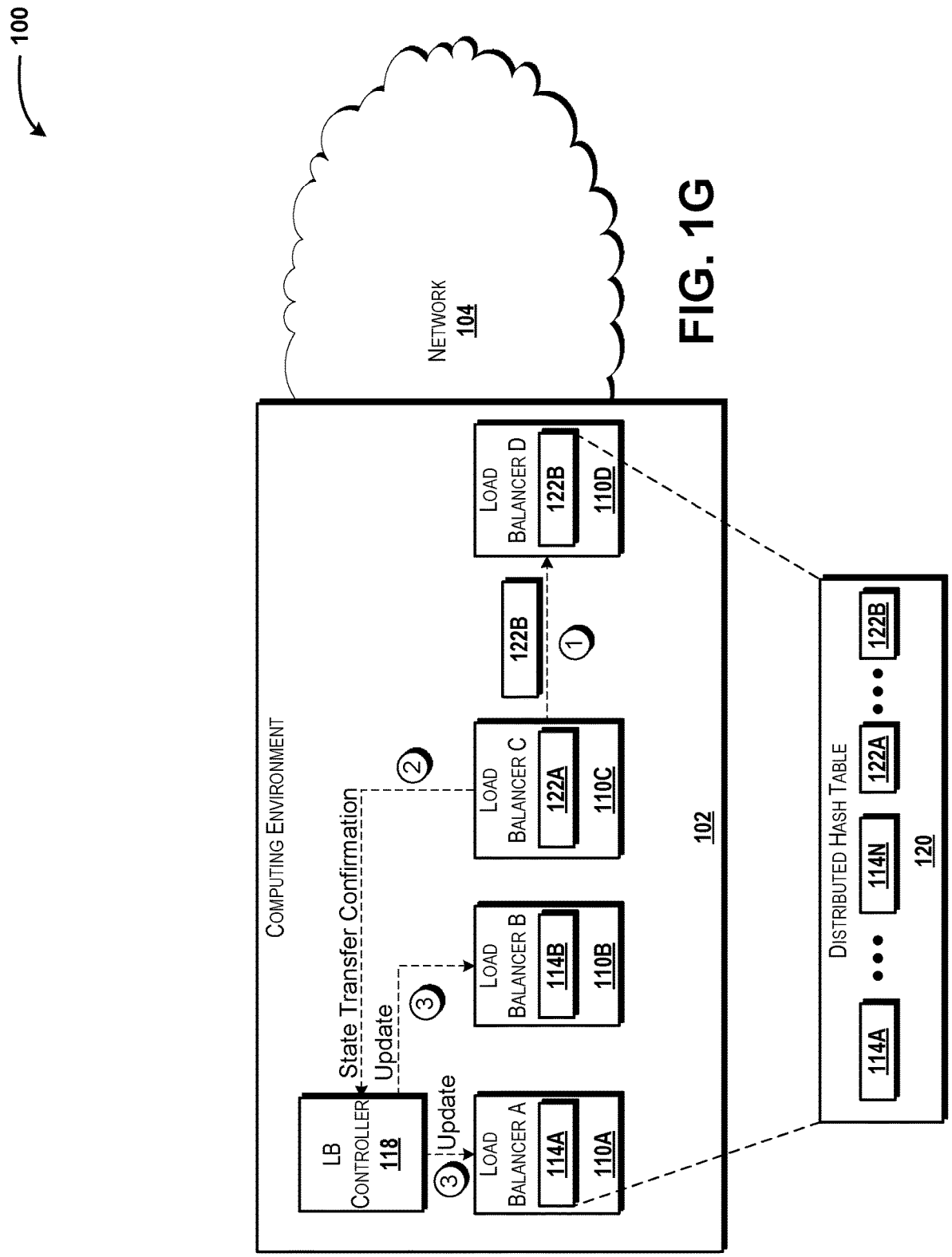

DISTRIBUTED STATEFUL LOAD BALANCER

BACKGROUND

Network data plane hardware and software can be characterized as either stateful or stateless. An element may be referred to as being "stateful" if the element maintains state associated with an individual data flow such as, for example, a connection established using transmission control protocol ("a TCP connection"). A stateful element such as, for example, a firewall, must observe all packets of single data flow in both forward and reverse direction to ensure that the element will operate correctly. Thus, stateful elements require flow affinity to be preserved. Preserving flow affinity, however, can be difficult in a distributed and/or elastically scaled computing environment.

A stateless network element that replaces a distributed stateful element may not preserve flow affinity in both directions of the flow. Similarly, if a stateless element is replaced with a stateful element, flow affinity in the forward direction may be disrupted when the element is added or removed. Still further scaling of stateful elements (e.g., introducing a new instance of a stateful element) can disrupt flows and/or flow affinity. Thus, one challenge in distributed computing environments is the task of interconnecting stateless and stateful network elements in a manner that preserves data flow affinity. With the growing trend including virtualization of stateful network functions such as, for example, firewalls, network address translation ("NAT") devices, and the like, this challenge can be more pronounced. Stateful virtual network functions may be required to operate, communicate, and/or otherwise interact with stateless networking devices and/or hardware, and there may be no way to preserve flow affinity in such environments.

In some cases, a gateway or other centralized device can store a flow table. A flow table can include entries for each flow path (e.g., keyed on a hash value generated based on packet headers). Such a flow table can require an entry for each traffic flow and therefore can be large and expensive (in terms of resource usage) to maintain and/or query. Thus, the use of centralized flow tables can be inefficient and may not be practical for distributed computing environments.

SUMMARY

The concepts and technologies disclosed herein are directed to providing stateful load balancers that are fault tolerant, elastically scalable, and flow affinity preserving even when replacing and/or interacting with stateless network elements. Thus, embodiments of the concepts and technologies disclosed herein can enable interconnection of stateless and stateful elements while preserving the flow affinity for stateful elements. A load balancer and/or data plane forwarder (hereinafter referred to as a "load balancer") can be introduced between stateless and stateful network elements. The load balancer can store mappings between flow identifiers (e.g., unique hashes of the source IP address, the destination IP address, the source port, the destination port, and the protocol) and an instance of a stateful network element that must receive all packets for this flow. According to various embodiments of the concepts and technologies disclosed herein, embodiments support scalability. Namely, the mappings can be maintained in a distributed hash table that can be spread across a set of load balancers.

A load balancer that receives a packet of a data flow can be configured to identify a load balancer that maintains an associated portion of the distributed hash table based on the flow identifier. The load balancer can query the identified load balancer. The identified load balancer can determine, based on its portion of the distributed hash table, which instance of the stateful element should receive the forwarded packet. This information can be provided to the requesting load balancer. For efficiency, the requesting load balancer can cache the response from the distributed hash table to avoid lookups of the distributed hash table for the subsequent packets of this flow.

A load balancer that receives the packet from a gateway can determine, based on a hash value associated with the packet, a load balancer to query for path information and/or ownership information (if the load balancer that receives the packet does not store path information for the packet). The load balancer can query the load balancer identified and receive a response with the path and/or ownership information. Based on the received information, the load balancer can forward the packet to an endpoint as identified. The load balancer that receives the response also can be configured to generate an entry for its distributed hash table portion, where the entry can identify the path, ownership and/or endpoint associated with the path. Thus, when a subsequent packet is received by the same load balancer (that generated the query), the load balancer can determine the path associated with the subsequent packet without querying another load balancer.

In the event of a scale event (e.g., a scaling of load balancing functionality and/or of servers of the computing environment), the load balancers can be configured to maintain flow affinity. In particular, if a new instance of the load balancing functionality is introduced to the computing environment, e.g., a new load balancer is added to the computing environment, a load balancer controller can be configured to redistribute and/or re-divide the distributed hash table across the load balancers and to update hash value ranges maintained by the load balancers. According to various embodiments of the concepts and technologies disclosed herein, the load balancer controller can be configured to generate a state transfer command and to send the state transfer command to one of the load balancers that is to offload some portion of its distributed hash table portion to the new load balancer. The load balancer controller can send the state transfer command to the load balancer and in response to receiving the state transfer command, the load balancer that receives the state transfer command can divide its associated distributed hash table portion into the two or more sub-portions. It can be appreciated that the two or more sub-portions can include at least the same data as was included in the distributed hash table portion. The load balancer also can be configured to transfer one of the sub-portions to the new load balancer that has been introduced to the computing environment.

The load balancer can transmit, to the new load balancer, one of the sub-portions and to retain another of the sub-portions. After transfer of the sub-portion to the new load balancer is completed, the load balancer can send a state transfer confirmation or other message to the load balancer controller to inform the load balancer controller that the state transfer is complete. The load balancer can be configured to send updates to the other load balancers to update the key ranges associated with the multiple distributed hash table portions. Thus, the load balancers can be updated to query the new load balancer if a packet with an associated hash value that is in a range of the sub-portion is received.

According to one aspect of the concepts and technologies disclosed herein, a system is disclosed. The system can include a processor and a memory. The memory can store computer-executable instructions that, when executed by the processor, cause the processor to perform operations. The operations can include storing, at a first load balancer that is in communication with a second load balancer, a first portion of a distributed hash table. The first portion of the distributed hash table can include a first range of hash keys and the second load balancer can store a second portion of the distributed hash table that can include a second range of hash keys. The operations further can include receiving a packet. A hash value calculated for the packet can be determined not to fall in the first range of hash keys. The operations further can include identifying, based on the hash value, that the second load balancer stores data that identifies a path associated with the packet, querying the second load balancer to identify the path associated with the packet, receiving the data that identifies the path, and forwarding, along the path, the packet to a network element.

In some embodiments, the computer-executable instructions, when executed by the processor, cause the processor to perform operations that further can include storing, in a cache associated with the first load balancer, the data that identifies the path; receiving, from the network element, a subsequent packet; determining, based on the cache, a reverse path associated with the subsequent packet; and forwarding, along the reverse path, the subsequent packet. In some embodiments, the computer-executable instructions, when executed by the processor, cause the processor to perform operations that further can include receiving a state transfer command from a load balancer controller; and in response to receiving the state transfer command, dividing the first portion of the distributed hash table into a first sub-portion that includes a third range of hash keys and a second sub-portion that includes a fourth range of hash keys, and sending, directed to a new load balancer, the first sub-portion.

In some embodiments, the load balancer controller can be configured to send an update to the second load balancer. The update can indicate that the first sub-portion that includes the third range of hash keys is located at the new load balancer. In some embodiments, the computer-executable instructions, when executed by the processor, cause the processor to perform operations that further can include receiving a further query from a third load balancer. The further query can include a request to identify a further path associated with a further packet. In some embodiments, the computer-executable instructions, when executed by the processor, cause the processor to perform operations that further can include determining that further data identifying the further path associated with the further packet is not stored at the first load balancer; and inserting, into the first portion of the distributed hash table, an entry that that defines the further path. The further path can be identified in the further query.

According to another aspect of the concepts and technologies disclosed herein, a method is disclosed. The method can include storing, at a first load balancer that can include a cache, a first portion of a distributed hash table. The first portion of the distributed hash table can include a first range of hash keys. The first load balancer can be in communication with a second load balancer. The second load balancer can store a second portion of the distributed hash table including a second range of hash keys. The method also can include receiving, by the first load balancer, a packet. A hash value calculated for the packet can be determined not to fall in the first range of hash keys. The method also can include identifying, by the first load balancer and based on the hash value, that the second load balancer stores data that identifies a path associated with the packet; querying, by the first load balancer, the second load balancer to identify the path associated with the packet; receiving, by the first load balancer, the data that identifies the path; and forwarding, by the first load balancer and along the path, the packet to a network element.

In some embodiments, the method further can include storing, by the first load balancer and in the cache, the data that identifies the path; receiving, by the first load balancer and from the network element, a subsequent packet; determining, by the first load balancer and based on the cache, a reverse path associated with the subsequent packet; and forwarding, by the first load balancer and along the reverse path, the subsequent packet. In some embodiments, the data that identifies the path can include a distributed hash table entry. The distributed hash table entry can be based on a data entry in the second portion of the distributed hash table.

In some embodiments, the method also can include receiving, by the first load balancer, a state transfer command from a load balancer controller; and in response to receiving the state transfer command, dividing, by the first load balancer, the first portion of the distributed hash table into a first sub-portion including a third range of hash keys and a second sub-portion including a fourth range of hash keys, and sending, by the first load balancer and directed to a new load balancer, the first sub-portion. In some embodiments, the method also can include sending, to the load balancer controller, a state transfer confirmation. The load balancer controller can be configured to send an update to the second load balancer. The update can indicate that the first sub-portion including the third range of hash keys is located at the new load balancer.

In some embodiments, the method also can include receiving, by the first load balancer, a further query from a third load balancer. The further query can include a request to identify a further path associated with a further packet. In some embodiments, the method also can include determining that further data identifying the further path associated with the further packet is not stored at the first load balancer; and inserting, into the first portion of the distributed hash table, an entry that that defines the further path. In some embodiments, the further path can be identified in the further query.

According to yet another aspect of the concepts and technologies disclosed herein, a computer storage medium is disclosed. The computer storage medium can store computer-executable instructions that, when executed by a processor, cause the processor to perform operations. The operations can include storing, at a first load balancer that is in communication with a second load balancer, a first portion of a distributed hash table. The first portion of the distributed hash table can include a first range of hash keys and the second load balancer can store a second portion of the distributed hash table that can include a second range of hash keys. The operations further can include receiving a packet. A hash value calculated for the packet can be determined not to fall in the first range of hash keys. The operations further can include identifying, based on the hash value, that the second load balancer stores data that identifies a path associated with the packet, querying the second load balancer to identify the path associated with the packet, receiving the data that identifies the path, and forwarding, along the path, the packet to a network element.

In some embodiments, the computer-executable instructions, when executed by the processor, cause the processor to perform operations further can include storing, in a cache associated with the first load balancer, the data that identifies the path; receiving, from the network element, a subsequent packet; determining, based on the cache, a reverse path associated with the subsequent packet; and forwarding, along the reverse path, the subsequent packet. In some embodiments, the data that identifies the path can include a distributed hash table entry. The distributed hash table entry can be based on a data entry in the second portion of the distributed hash table. In some embodiments, the computer-executable instructions, when executed by the processor, can cause the processor to perform operations that further can include receiving a state transfer command from a load balancer controller; and in response to receiving the state transfer command, dividing the first portion of the distributed hash table into a first sub-portion including a third range of hash keys and a second sub-portion including a fourth range of hash keys, and sending, directed to a new load balancer, the first sub-portion.

In some embodiments, the load balancer controller can be configured to send an update to the second load balancer. The update can indicate that the first sub-portion including the third range of hash keys is located at the new load balancer. In some embodiments, the computer-executable instructions, when executed by the processor, can cause the processor to perform operations that further can include receiving a further query from a third load balancer. The further query can include a request to identify a further path associated with a further packet. In some embodiments, the computer-executable instructions, when executed by the processor, can cause the processor to perform operations that further can include determining that further data identifying the further path associated with the further packet is not stored at the first load balancer; and inserting, into the first portion of the distributed hash table, an entry that that defines the further path. In some embodiments, the further path can be identified in the further query.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

BRIEF DESCRIPTION OF THE DRAWINGS

FIGS. 1A-1G are system diagrams illustrating aspects of an illustrative operating environment for various embodiments of the concepts and technologies described herein.

DETAILED DESCRIPTION

Figure 1A:
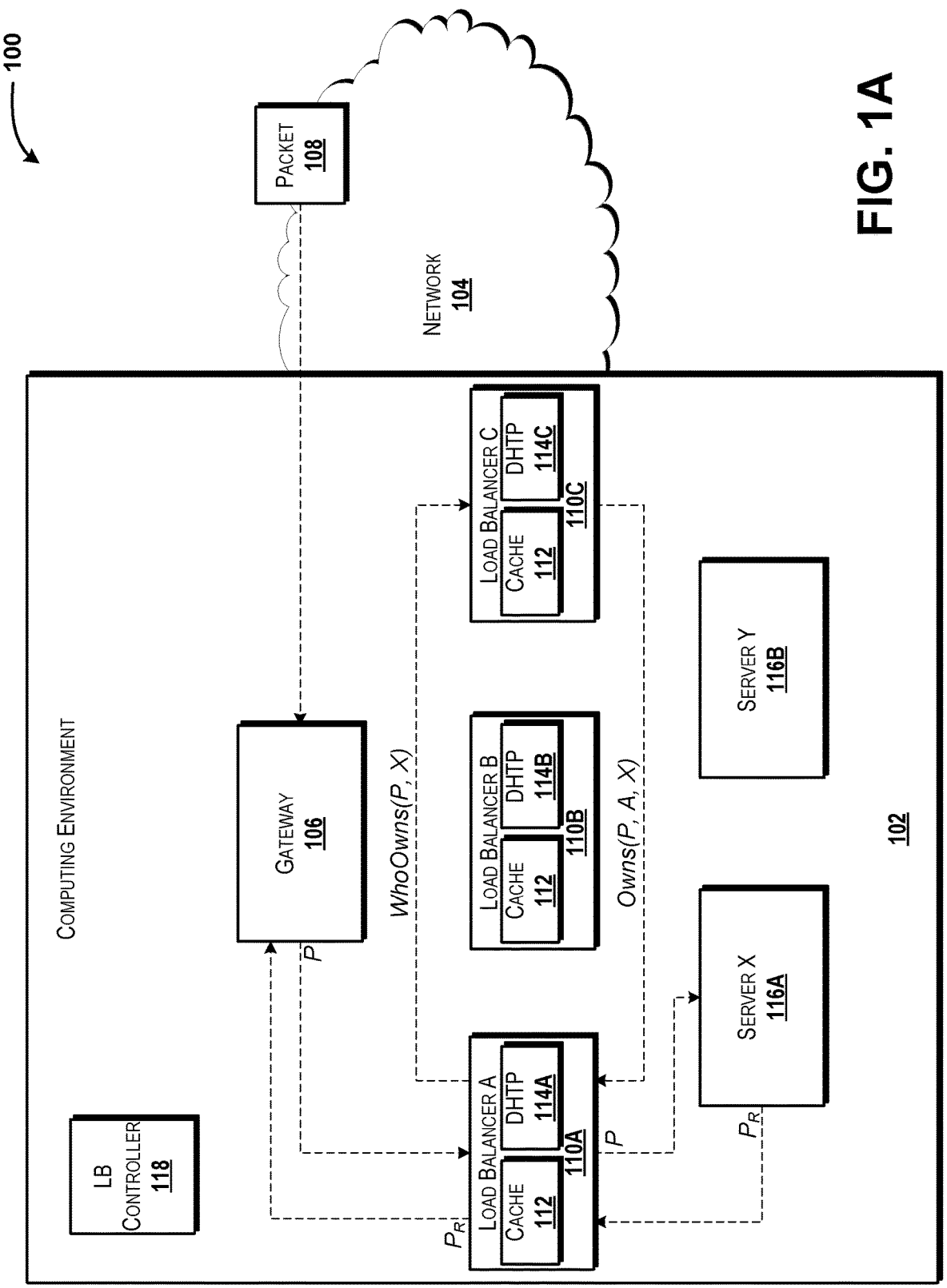

The following detailed description is directed to a distributed stateful load balancer (hereinafter referred to as a "load balancer"). A load balancer that receives the packet from a gateway can determine, based on a hash value associated with the packet, a load balancer to query for path information and/or ownership information (if the load balancer that receives the packet does not store path information for the packet). The load balancer can query the load balancer identified and receive a response with the path and/or ownership information. Based on the received information, the load balancer can forward the packet to an endpoint as identified. The load balancer that receives the response also can be configured to generate an entry for its distributed hash table portion, where the entry can identify the path, ownership and/or endpoint associated with the path. Thus, when a subsequent packet is received by the same load balancer (that generated the query), the load balancer can determine the path associated with the subsequent packet without querying another load balancer.

In the event of a scale event (e.g., a scaling of load balancing functionality and/or of servers of the computing environment), the load balancers can be configured to maintain flow affinity. In particular, if a new instance of the load balancing functionality is introduced to the computing environment, e.g., a new load balancer is added to the computing environment, a load balancer controller can be configured to redistribute and/or re-divide the distributed hash table across the load balancers and to update hash value ranges maintained by the load balancers. According to various embodiments of the concepts and technologies disclosed herein, the load balancer controller can be configured to generate a state transfer command and to send the state transfer command to one of the load balancers that is to offload some portion of its distributed hash table portion to the new load balancer. The load balancer controller can send the state transfer command to the load balancer and in response to receiving the state transfer command, the load balancer that receives the state transfer command can divide its associated distributed hash table portion into the two or more sub-portions. It can be appreciated that the two or more sub-portions can include at least the same data as was included in the distributed hash table portion. The load balancer also can be configured to transfer one of the sub-portions to the new load balancer that has been introduced to the computing environment.

The load balancer can transmit, to the new load balancer, one of the sub-portions and to retain another of the sub-portions. After transfer of the sub-portion to the new load balancer is completed, the load balancer can send a state transfer confirmation or other message to the load balancer controller to inform the load balancer controller that the state transfer is complete. The load balancer can be configured to send updates to the other load balancers to update the key ranges associated with the multiple distributed hash table portions. Thus, the load balancers can be updated to query the new load balancer if a packet with an associated hash value that is in a range of the sub-portion is received.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIGS. 1A-1G, aspects of an operating environment 100 for various embodiments of the concepts and technologies disclosed herein for a distributed stateful load balancer will be described, according to an illustrative embodiment. The operating environment 100 shown in FIGS. 1A-1G can include a computing environment 102. The computing environment 102 can operate in communication with and/or can include a part of a communications network ("network") 104.

According to various embodiments, the functionality of the computing environment 102 may be provided by one or more server computers, desktop computers, mobile telephones, laptop computers, tablet computers, other computing systems, and the like. In various embodiments of the concepts and technologies disclosed herein, the functionality of the computing environment 102 can be provided by one or more data centers and/or portions thereof such as server computers, or the like. Thus, it should be understood that the functionality of the computing environment 102 can be provided by a single device, by two similar devices, and/or by two or more dissimilar devices. The computing environment 102 includes at least a processor and a memory. An example architecture for the computing environment 102 will be illustrated and described below with reference to FIG. 6. For purposes of describing the concepts and technologies disclosed herein, the computing environment 102 will be described herein as a data center including at least one server computer having a processor and a memory. It should be understood that this embodiment is illustrative, and should not be construed as being limiting in any way.

The computing environment 102 can include a gateway 106. The gateway 106 can correspond to an ingress point associated with the computing environment 102. In some embodiments, the gateway 106 can control ingress of data and/or flows to the computing environment 102 from networks such as the network 104, as well as egress of data and/or flows from the computing environment 102 to other networks such as the network 104. In some example implementations, packetized traffic (e.g., traffic that includes a packet 108) can enter and/or leave the computing environment 102 via the gateway 106. As is generally understood, packets 108 can include headers that can identify, inter alia, the source IP address, the destination IP address, the source port, the destination port, and the protocol associated with the packet 108. The gateway 106 can be configured to generate a hash value based on the data in the headers, if desired, and/or the gateway 106 can forward the packet 108 to other entities that can generate hash values. It should be understood that this example is illustrative, and therefore should not be construed as being limiting in any way.

According to various embodiments of the concepts and technologies disclosed herein, the computing environment can include two or more load balancers 110A-110C (hereinafter collectively and/or generically referred to as "load balancers 110"). The load balancers 110 can include, in some embodiments, multiple instances of virtual functions (e.g., load balancing virtual functions) that can be executed by the computing environment. It should be understood that this example is illustrative, and therefore should not be construed as being limiting in any way.

The gateway 106 can be configured to route a received packet 108 to one of the load balancers 110. In some embodiments, the gateway 106 can be configured to apply an equal cost multi-path ("ECMP") scheme to distribute packets to the load balancers 110. Thus, for example, a packet 108 may be received by the gateway 106, and the gateway 106 can identify one of the load balancers 110 based on an ECMP policy or scheme. It therefore can be appreciated that according to various embodiments of the concepts and technologies disclosed herein, the gateway 106 can operate as a stateless load balancer, in various embodiments. As will be explained in more detail herein, each of the load balancers 110 illustrated and described herein can operate as a stateful load balancer.

Once the path is established between the gateway 106 and one of the load balancers 110, data associated with the path (e.g., ownership of the path and/or endpoints associated therewith) can be stored by one or more of the load balancers 110. In particular, each of the load balancers 110 can include, inter alia, a cache 112 and a distributed hash table portion 114A-114C (hereinafter collectively and/or generically referred to as "distributed hash table portion 114"). The cache 112 and/or the distributed hash table portions 114 can identify paths between the load balancers 110 and one or more endpoints such as the gateway 106 and/or servers 116A-116B (hereinafter collectively and/or generically referred to as "servers 116"). A load balancer controller 118 can be configured to control the updating and/or maintenance of the distributed hash table portions 114, in some embodiments.

As can be appreciated with reference to FIGS. 1A-1G, the distributed hash table portions 114 can be partitions or portions of a distributed hash table 120. Thus, as used herein and in the claims, a "portion of a distributed hash table" can correspond to a portion or partition of the distributed hash table 120. The distributed hash table 120 can collectively be represented by the distributed hash table portions 114. According to various embodiments, the distributed hash table 120 can be represented by multiple distributed hash table portions 114 that can be distributed across the load balancers 110. It should be understood that this example is illustrative, and therefore should not be construed as being limiting in any way.

According to various embodiments of the concepts and technologies disclosed herein, a load balancer 110 can receive a forwarded packet from the gateway 106. The load balancer 110 can examine a local distributed hash table portion 114 to determine a path associated with the packet 108. A path associated with a packet 108 may be important for applications and/or environments in which flow affinity must be maintained. Thus, the load balancers 110 can be configured to store data that can identify paths and/or ownership for data flows (e.g., traffic associated with a packet 108) so that the packet can be reliably forwarded to a correct endpoint (e.g., a particular server 116, or the like). Each of the load balancers 110 can store, in addition to an associated distributed hash table portion 114, a key table or other data structure that can indicate key ranges of distributed hash table portions 114 stored by the load balancers 110. Thus, when a packet 108 is received at a load balancer 110, the load balancer 110 can obtain a hash value associated with the packet 108. It can be appreciated that the hash value can be received from other entities or generated by the load balancer 110 and that the hash value can uniquely identify a flow associated with the packet 108.

Thus, the load balancer 110 can identify a distributed hash table portion 114 that stores information that identifies the path associated with the packet 108. The load balancer 110 can be configured to generate a query. The query can request path information and/or ownership information for a packet 108. Thus, the query also can include the hash value, in some embodiments. The query also can include an instruction to insert a path in a distributed hash table portion 114 if the distributed hash table portion 114 does not include the path information (e.g., if the packet 108 is associated with a new flow that is not yet represented by the distributed hash table portions 114. The query can be sent to the load balancer 110 identified. If the queried load balancer 110 identifies an entry in its distributed hash table portion 114, the load balancer 110 can respond to the query with a response that includes, inter alia, data that identifies the path and/or ownership information. It should be understood that this example is illustrative, and therefore should not be construed as being limiting in any way.

The load balancer 110 that generated the query can receive the response and forward the packet 108 along the path identified in the response. The load balancer 110 that receives the response also can be configured to store the data that identifies the path in its cache and/or its distributed hash table portion 114 for use when subsequent packets associated with the flow are received. It should be understood that this example is illustrative, and therefore should not be construed as being limiting in any way.

Figure 1B:
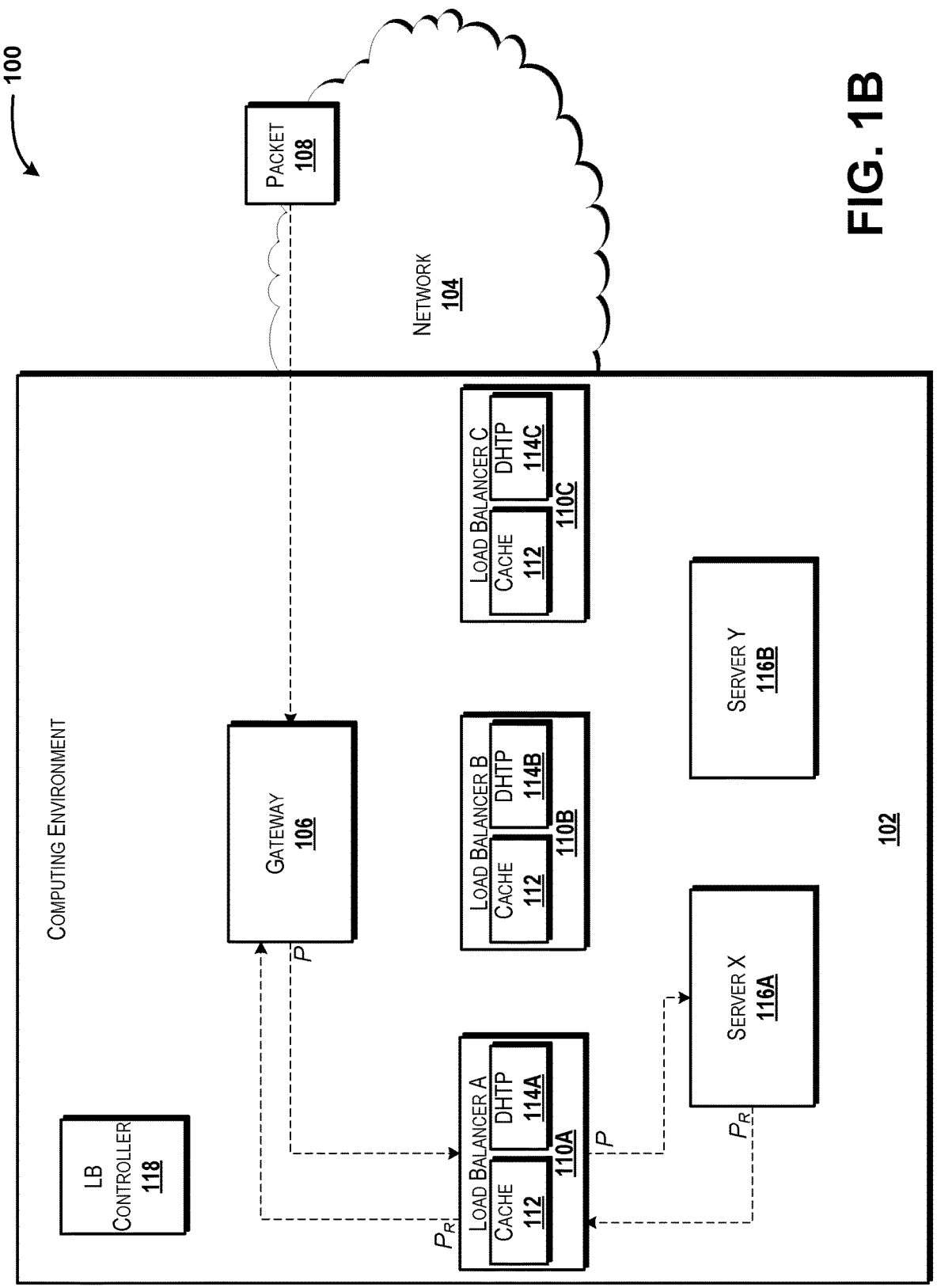
Figure 1C:
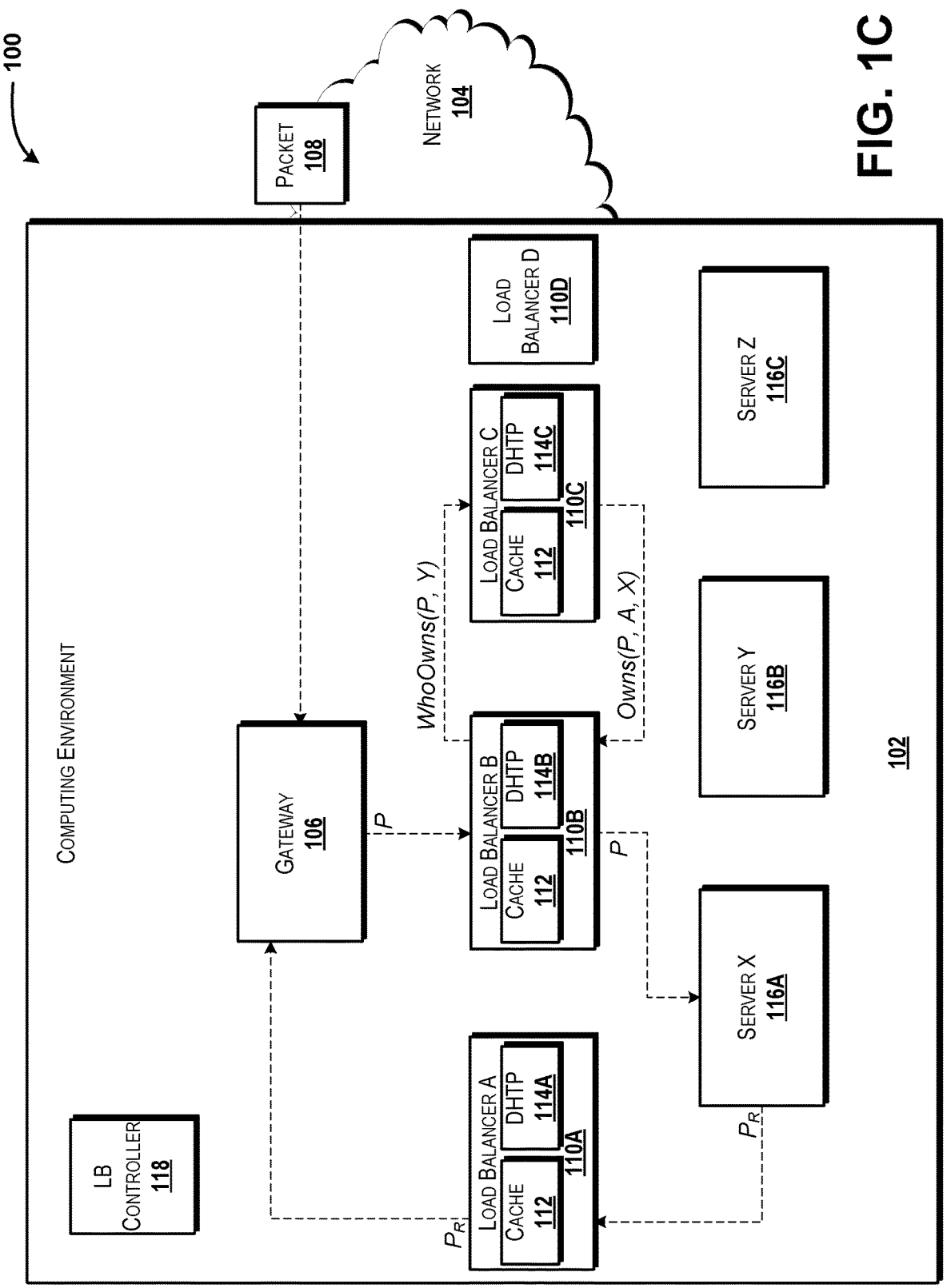
Figure 1D:
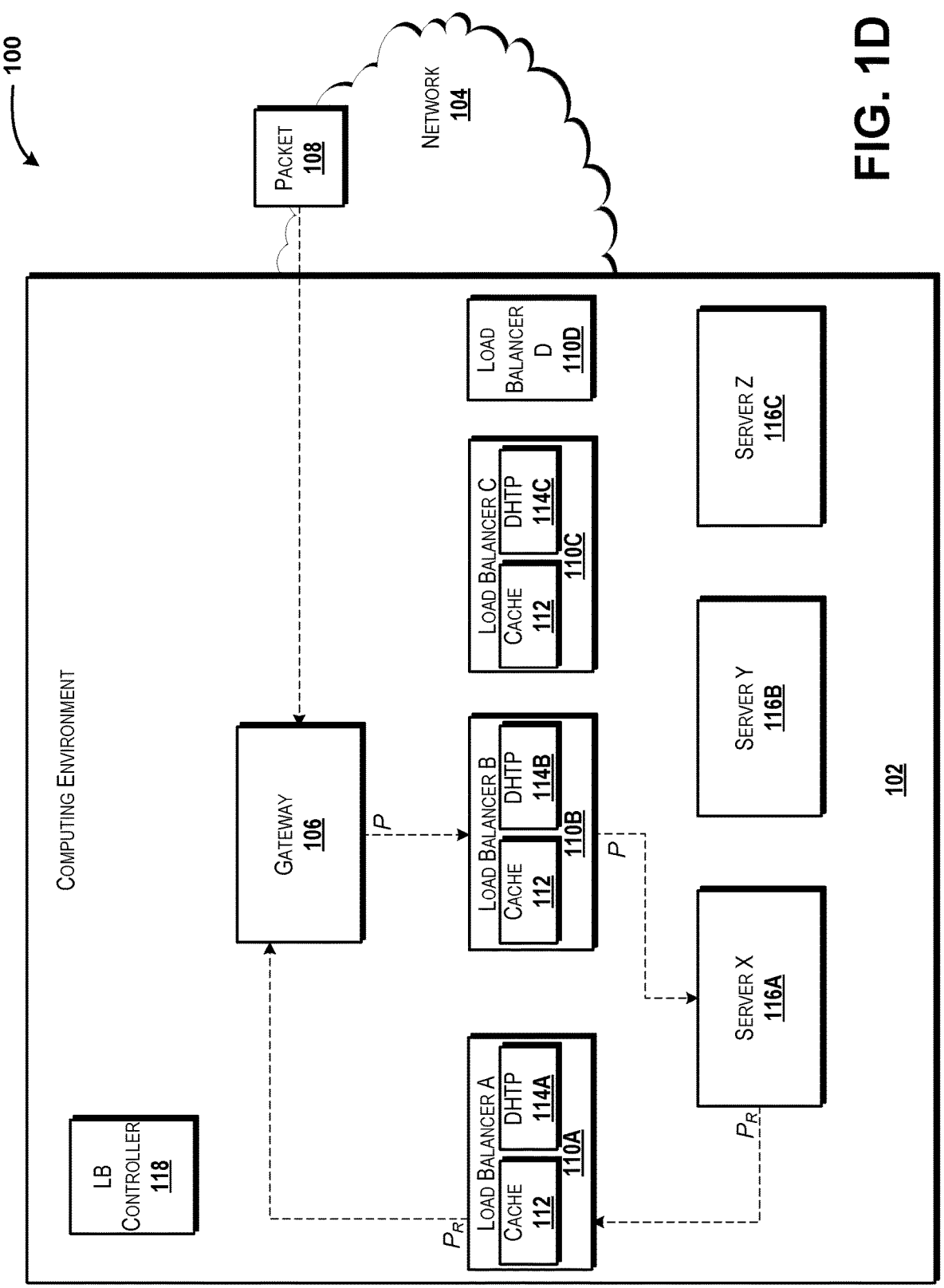

As shown in FIGS. 1C-1D, and as can be appreciated from the description herein, when a new load balancer 110 is added, the gateway 106, which may apply an ECMP routing scheme to packets 108 received by the gateway 106, may route a packet 108 associated with a particular path to a different load balancer 110 (i.e., a load balancer 110 other than a load balancer 110 that previously was involved in forwarding packets 108 associated with a particular flow to a specific server 116). Thus, scaling of the load balancers 110 can cause the flow affinity between a load balancer 110 and an endpoint such as a server 116 to be lost. Embodiments of the concepts and technologies disclosed herein can prevent such a loss of flow affinity.

It also can be appreciated with reference to FIG. 1C, that in some embodiments, the addition of the new load balancer 110 can be in response to the addition of a new server 116C (Server Z). Although the new server 116C has been added, the existing flow can still be routed to the same server 116A as before the addition of the new server 116C. Thus, it can be appreciated that by using the concepts and technologies disclosed herein, flow affinity can be restored and/or not lost. In particular, as will be explained below with reference to FIG. 1D, the concepts and technologies disclosed herein can be used to allow server scaling while preserving flow affinity (in addition to preserving flow affinity after scaling the load balancing functions).

Additionally, as will be appreciated with reference to FIG. 1D below, embodiments of the concepts and technologies disclosed herein enable maintaining flow affinity for a flow or path whether the connection associated with the flow or path is imitated by one of the servers 116 and/or initiated by an outside user or entity (with the flow being directed to one of the servers 116). Thus, embodiments of the concepts and technologies disclosed herein can support scaling of load balancers 110 and servers 116 while maintaining flow affinity. It should be understood that these examples are illustrative, and therefore should not be construed as being limiting in any way.

In particular, as shown in FIG. 1C-1D, the load balancer 110B that receives the packet 108 from the gateway 106 (instead of the load balancer 110A that previously was receiving packets as shown in FIGS. 1A-1B) can determine, based on a hash value associated with the packet 108, a load balancer 110 to query for path information and/or ownership information. The load balancer 110 can receive a response with the path and/or ownership information and forward the packet to the endpoint identified. The load balancer 110 that receives the response can generate an entry for its distributed hash table portion 114, where the entry can identify the endpoint. Thus, when a subsequent packet is received, the load balancer 110 can determine the path associated with the subsequent packet without querying another load balancer 110. It should be understood that this example is illustrative, and therefore should not be construed as being limiting in any way.

Embodiments of the concepts and technologies disclosed herein also can be configured to support elastic scaling of load balancing functionality and/or of servers of the computing environment 102. In particular, if a new instance of the load balancing functionality is introduced to the computing environment 102, e.g., a new load balancer 110D is added to the computing environment 102, the load balancer controller 118 can be configured to redistribute and/or re-divide the distributed hash table 120 across the load balancers 110. In the context of the example implementations shown in FIGS. 1A-1G, the load balancer controller 118 can be configured to re-divide and/or redistribute the distributed hash table 120 (from being distributed across three distributed hash table portions 114A-C as shown in FIGS. 1E-1F to being distributed across two distributed hash table portions 114A-B and two sub-portions 122A-B (hereinafter collectively and/or generically referred to as "sub-portions 122") of the distributed hash table portion 114C as shown in FIG. 1G.

According to various embodiments of the concepts and technologies disclosed herein, the load balancer controller 118 can be configured to generate a state transfer command and to send the state transfer command to one of the load balancers 110. In the example shown in FIG. 1E, the load balancer controller 118 can send the state transfer command to the load balancer 110C. It should be understood that this example is illustrative, and therefore should not be construed as being limiting in any way.

In response to receiving the state transfer command, the load balancer 110C can be configured to divide its associated distributed hash table portion 114C into the two sub-portions 122. An example of this dividing of the distributed hash table portion 114C into the two sub-portions 122 is illustrated in FIG. 1F. It can be appreciated that the two sub-portions 122 can include the same data as was included in the distributed hash table portion 114C. The load balancer 110C can be configured to transfer one of the sub-portions 122 to a new load balancer 110D that has been introduced to the computing environment 102.

In the example shown in FIG. 1G, the load balancer 110C can transmit, to the load balancer 110D, the sub-portion 122B and can retain the sub-portion 122A. It similarly can be understood that the sub-portion 122A can replace the distributed hash table portion 114C and/or can be functionally equivalent to a new version of the distributed hash table portion 114C at the load balancer 110C. Similarly, the sub-portion 122B can functionally be equivalent to a distributed hash table portion 114D for the load balancer 110D. It should be understood that this example is illustrative, and therefore should not be construed as being limiting in any way.

After transfer of the sub-portion 122B to the new load balancer 110D is completed, the load balancer 110C can send a state transfer confirmation or other message to the load balancer controller 118 to inform the load balancer controller 118 that the state transfer is complete. The load balancer controller 118 can be configured to send updates to the other load balancers 110 (e.g., the load balancers 110A and 110B) to update the key ranges associated with the multiple distributed hash table portions 114. Thus, the load balancers 110 can be updated to query the load balancer 110D (instead of the load balancer 110C) if a packet 108 with an associated hash value that is in a range of the sub-portion 122B is received. It should be understood that this example is illustrative, and therefore should not be construed as being limiting in any way.

FIGS. 1A-1G illustrate one computing environment 102, one network 104, one gateway 106, three and four load balancers 110, two servers 116, and one load balancer controller 118. It should be understood, however, that various implementations of the operating environment 100 can include more than one computing environment 102; more than one network 104; more than one gateway 106; two, three, four, or more than four load balancers 110; more than two servers 116; and/or zero, one, or more than one load balancer controller 118. As such, the illustrated embodiments should be understood as being illustrative, and should not be construed as being limiting in any way.

Figure 2:
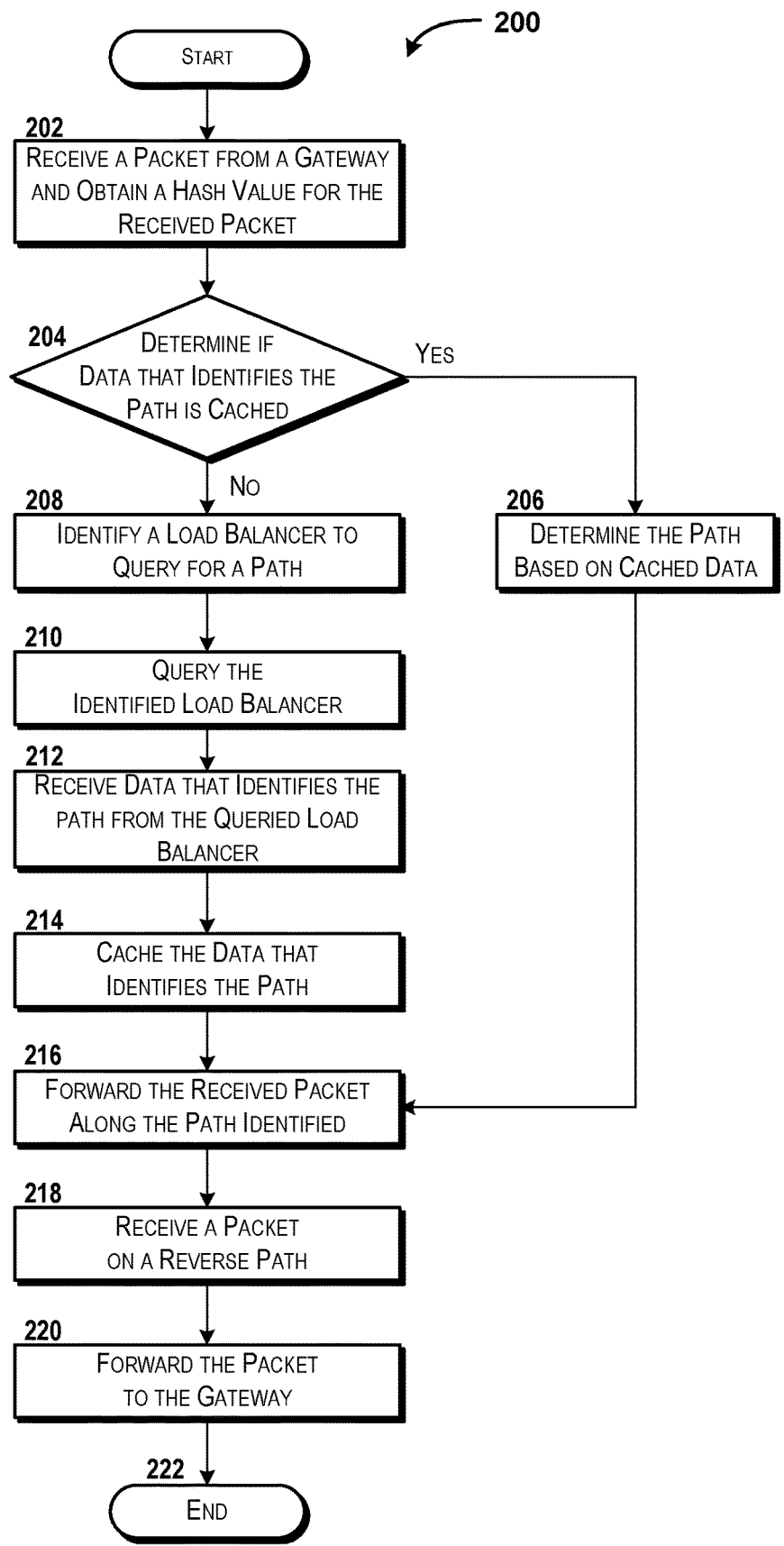
FIG. 2 is a flow diagram showing aspects of a method for providing a distributed stateful load balancer, according to an illustrative embodiment of the concepts and technologies described herein.

Turning now to FIG. 2, aspects of a method 200 for providing a distributed stateful load balancer will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the computing environment 102, to perform one or more operations and/or causing the processor to direct other components of the computing system or device to perform one or more of the operations.

For purposes of illustrating and describing the concepts of the present disclosure, the method 200 is described herein as being performed by the load balancer 110B. It should be understood that any one of the load balancers 110 can perform the method 200, according to various embodiments. For purposes of clarifying the concepts and technologies disclosed herein, the example implementations illustrated in FIGS. 1A-1D will be referred to when describing the operations of FIG. 2. The method 200 will be described as being performed by the load balancer 110B, in accordance with the example shown in FIGS. 1C-1D. Because other load balancers 110 can perform some or all of the operations illustrated and described herein, and because additional and/or alternative devices and/or network nodes can provide the functionality described herein via execution of one or more modules, applications, and/or other software, it should be understood that the illustrated embodiment is illustrative, and should not be viewed as being limiting in any way.

The method 200 begins at operation 202. At operation 202, the load balancer 110B can receive a packet 108 from a gateway 106. In operation 202, the load balancer 110B also can obtain a hash value for the received packet 108. In some embodiments, the gateway 106 can receive the packet 108 from a network external to the computing environment 102, for example the network 104, and the gateway 106 can generate a hash value for the packet 108 and forward that hash value along with the packet 108 to the load balancer 110B. In some other embodiments, the gateway 106 can forward the packet 108 to the load balancer 110B, and the load balancer 110B can generate the hash value. Regardless of how the hash value is generated, it can be understood that the load balancer 110B that receives the packet 108 can also obtain a hash value associated with the packet 108.

According to various embodiments, as explained above with reference to FIGS. 1A-1G, the gateway 106 can be configured to forward the packet 108 to the load balancer 110B by applying an equal cost multipath ("ECMP") scheme whereby packets associated with traffic (e.g., the packet 108) can be distributed to the load balancers 110 without analysis by the gateway 106. In the example shown in FIG. 1C, however, it can be appreciated that traffic associated with a particular flow previously may have been forwarded by the load balancer 110A, but due to, for example, an addition of another load balancer 110, the traffic may now be forwarded to the load balancer 110B. For example, if there are n load balancers 110, an nth load balancer 110N may receive every nth packet 108 on average, as the gateway 106 can be configured to distribute the packets 108 across the n load balancers 110. It should be understood that this example is illustrative, and therefore should not be construed as being limiting in any way.

From operation 202, the method 200 can proceed to operation 204. At operation 204, the load balancer 110B can determine if data that identifies the path associated with the packet 108 is cached by the load balancer 110B (i.e., stored in the cache 112 of the load balancer 110B). As explained above, and as will be explained in more detail below with reference to operation 214, the load balancer 110B can be configured to store data that identifies paths in its cache 112. In particular, if the load balancer 110B receives a packet 108 and does not own the path associated with the packet 108 and/or recognizes that another load balancer 110 stores a distributed hash table portion 114 that identifies the path associated with the packet, the load balancer 110B can query that load balancer 110 and obtain data that identifies the path. This data can be stored by the load balancer 110B in its cache 112 so that when a future packet 108 associated with the particular path is received, the load balancer 110B can determine the path for that packet 108 via a search of its cache 112 (thereby obviating the need to identify another load balancer 110 that stores data identifying the path, querying that identified load balancer 110, and receiving the data that identifies the path.

Thus, it can be appreciated that the caching of the data that identifies the path can result in improved efficiency of systems in accordance with various embodiments of the concepts and technologies disclosed herein. Namely, such a system can reduce its local processing operations (e.g., to identify the load balancer 110 to query) and network usage (e.g., by sending queries to and/or receiving responses from the identified load balancer 110). Thus, if the load balancer 110B determines, in operation 204 that the cache 112 stores data that identifies a path associated with the packet 108 received in operation 202, this can indicate that a previous packet 108 has been received by the load balancer 110B and operations for obtaining the data identifying the path previously were performed. Thus, subsequent received packets 108 in a particular session can be forwarded by the load balancer 110B without identifying other load balancers 110 and/or communicating with those load balancers 110, thereby improving efficiency of the load balancer 110B and/or a system including the load balancer 110B. It should be understood that this example is illustrative, and therefore should not be construed as being limiting in any way.

If the load balancer 110B determines, in operation 204, that data identifying a path associated with the packet 108 is stored in the cache 112, the method 200 can proceed to operation 206. At operation 206, the load balancer 110B can determine the path based on the cached data. Thus, as noted above, the load balancer 110B can determine the path for the packet 108 received in operation 202 without: a) identifying the load balancer 110 that stores a distributed hash table portion 114 that stores the data identifying the path associated with the packet 108; b) querying the identified load balancer 110 for the data that identifies the path associated with the packet 108; and/or c) receiving, from the identified load balancer 110, the data that identifies the path associated with the packet 108.

If the load balancer 110B determines, in operation 204, that data identifying the path associated with the packet 108 is not stored in the cache 112, the method 200 can proceed to operation 208. At operation 208, the load balancer 110B can identify, among multiple load balancers 110 (including itself), a load balancer 110 to query to identify a path associated with the packet 108 received in operation 202. In operation 208, therefore, the load balancer 110B can determine that it does not own the path associated with the packet 108 received in operation 202 and that another load balancer 110 will be queried to determine ownership of the path. In the example implementation shown in FIG. 1C, the load balancer 110C is queried by the load balancer 110B. As such, this example implementation will be used in the description of the method 200 for clarity.

According to various embodiments of the concepts and technologies disclosed herein, the load balancer 110B can identify the load balancer 110 to query based on the hash value obtained in operation 202. In particular, the load balancer 110B can store data that identifies hash value ranges (hash ranges) associated with each of the distributed hash table portions 114 stored by the load balancers 110. For a particular hash value, e.g., the hash value obtained in operation 202, the load balancer 110B can determine which distributed hash table portion 114 includes a range in which the hash value falls or fits, and the based on this determination, the load balancer 110B can identify the load balancer 110C to query for the path. Because the identification of the owner of a distributed hash table portion 114 is understood, this will not be further discussed herein.

From operation 208, the method 200 can proceed to operation 210. At operation 210, the load balancer 110B can query the load balancer 110C (or other load balancer 110 as identified in operation 208). The query generated and/or transmitted in operation 210 can be generated and/or transmitted for the purpose of identifying the path for the packet received in operation 202. The query can include two portions of data. A first portion of the query can inquire as to the path associated with the packet 108 received in operation 202. A second portion of the query can instruct the receiving load balancer 110C (i.e., the load balancer 110 that is receiving the query sent in operation 210) to insert an entry in the distributed hash table portion 114C stored by the load balancer 110C if an entry does not exist in the distributed hash table portion 114C. Thus, embodiments of the concepts and technologies disclosed herein can reduce traffic among and/or between the load balancers 110 by enabling the insertion of entries in a distributed hash table 120 and/or portions thereof such as the distributed hash table portions 114 if no such entry is determined to exist. It should be understood that this example is illustrative, and therefore should not be construed as being limiting in any way.

From operation 210, the method 200 can proceed to operation 212. At operation 212, the load balancer 110B can receive response from the queried load balancer 110C. The response received in operation 212 can include data that identifies the path. In some embodiments, the response also can include data that instructs the load balancer 110B to store the data identifying the path. In some embodiments, the response received in operation 212 can correspond to an entry for a distributed hash table 120 and/or a portion thereof such as the distributed hash table portion 114B stored by the load balancer 110B. As shown in the example implementation shown in FIG. 1D, the load balancer 110B can be informed by the response that the path for the packet 108 is to the server 116A; and that the path is owned by the load balancer 110A. Because the data received in operation 212 can be formatted in other ways and/or can indicate other paths and/or ownerships, it should be understood that this example is illustrative, and therefore should not be construed as being limiting in any way.

From operation 212, the method 200 can proceed to operation 214. At operation 214, the load balancer 110B can cache the data that identifies the path and/or ownership as received in operation 212. According to various embodiments, the load balancer 110B can store the data in the cache 112. According to various embodiments of the concepts and technologies disclosed herein, the data stored in the cache 112 can be stored for a time t. In various embodiments, the time t can correspond to a lifetime of the connection associated with the packet 108. In some other embodiments, the time t can be determined based on settings, preferences, and/or other considerations. It should be understood that this example is illustrative, and therefore should not be construed as being limiting in any way.

It also can be understood that the load balancer 110B can insert the data that identifies the path and/or ownership (e.g., if formatted as a distributed hash table entry) in the distributed hash table portion 114A stored by the load balancer 110B. The caching of the data that identifies the path and/or ownership can be used to improve efficiency of the computing environment 102 by reducing lookups and/or queries for subsequently-received packets 108. It should be understood that this example is illustrative, and therefore should not be construed as being limiting in any way.

From operation 214, the method 200 can proceed to operation 216. The method 200 also can proceed to operation 216 from operation 206. At operation 216, the load balancer 110B can forward the packet 108 along the path identified. Thus, the load balancer 110B can forward the packet 108 to the recipient identified by the path (e.g., the server 116A as shown in the example implementation shown in FIG. 1A). The packet 108 can include headers that identify the load balancer 110B, as generally is understood. Thus, the server or other network element that receives the packet 108 can be configured to send subsequent packets to the load balancer 110B. It should be understood that this example is illustrative, and therefore should not be construed as being limiting in any way.

Based on FIGS. 1A-1D, it can be appreciated that the operations 218 and 220 can be performed by any of the load balancers 110 illustrated and described herein. In particular, it can be appreciated that the packet 108 can specify a load balancer 110 in its headers that may be the same or may be different from the load balancer 110B that forwarded the packet 108 in operation 216. As such, it should be understood that operations 218 and 220 of the method 200 can performed by any one of the load balancers 110. In multiple implementations, as shown in FIGS. 1A-1D, the load balancer 110A can perform the operations 218 and 220. It should be understood that this example is illustrative, and therefore should not be construed as being limiting in any way.

From operation 216, the method 200 can proceed to operation 218. At operation 218, the load balancer 110A can receive a packet on a reverse path from the server 116A. For example, the server 116A can receive the packet 108 forwarded in operation 216, and respond with a subsequent packet that arrives at the load balancer 110A in operation 218. The load balancer 110A can examine a local cache 112 and/or distributed hash table portion 114A and can determine, based on that examination, that the subsequent packet is to be forwarded to the gateway 106. From operation 218, the method 200 can proceed to operation 220. At operation 220, the load balancer 110A can forward the packet to the gateway 106.

According to various embodiments, the forwarding of the subsequent packet as described in operations 216 and 218 can be performed by the load balancer 110A. Prior to performance of the operation 202, a path as shown in FIGS. 1A-1B can have existed, and the load balancer 110A can have already stored, in its cache 112 and/or distributed hash table portion 114A information that identifies the path. As such, it should be understood that this example is illustrative, and therefore should not be construed as being limiting in any way.

From operation 220, the method 200 can proceed to operation 222. The method 200 can end at operation 222.

Figure 3:
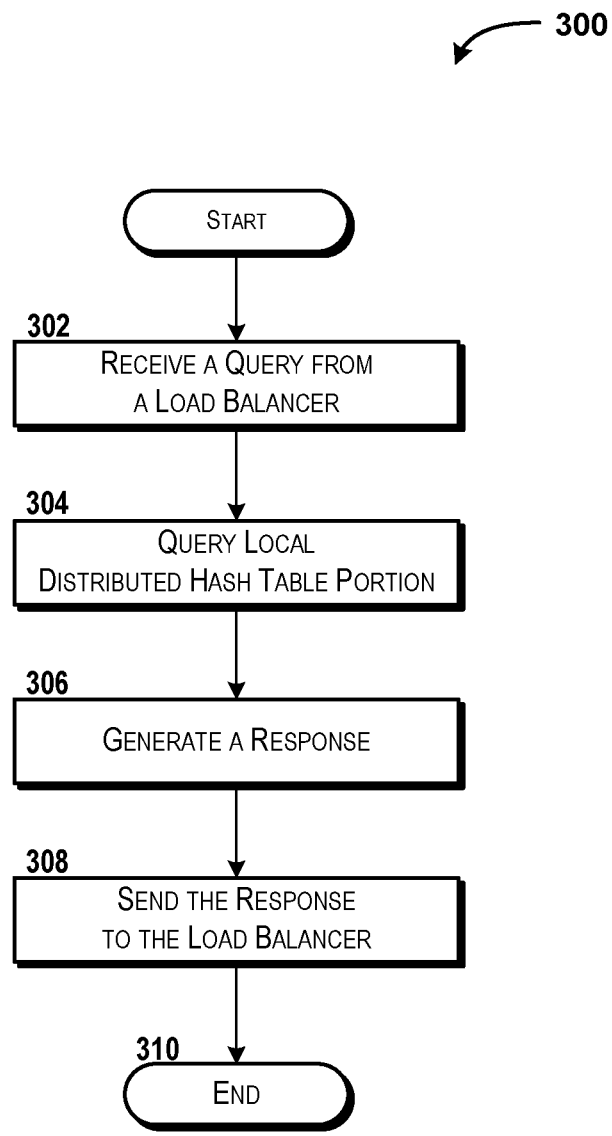
FIG. 3 is a flow diagram showing aspects of a method for providing a distributed hash table entry to a distributed stateful load balancer, according to an illustrative embodiment of the concepts and technologies described herein.

Turning now to FIG. 3, aspects of a method 300 for providing a distributed hash table entry to a distributed stateful load balancer will be described in detail, according to an illustrative embodiment. For purposes of illustrating and describing the concepts of the present disclosure, the method 300 is described herein as being performed by the load balancer 110C. It should be understood that any one of the load balancers 110 can perform the method 300, according to various embodiments. For purposes of clarifying the concepts and technologies disclosed herein, the example implementations illustrated in FIGS. 1A-1D will be referred to when describing the operations of FIG. 3. Because other load balancers 110 can perform some or all of the operations illustrated and described herein, and because additional and/or alternative devices and/or network nodes can provide the functionality described herein via execution of one or more modules, applications, and/or other software, it should be understood that the illustrated embodiment is illustrative, and should not be viewed as being limiting in any way.

The method 300 begins at operation 302. At operation 302, the load balancer 110C can receive a query. The query can be received from any other load balancer 110. In the example shown in FIG. 1A, for example, the load balancer 110C can receive a query from the load balancer 110A in an operation similar to operation 302. In the example shown in FIG. 1C, the load balancer 110C can receive the query from the load balancer 110B. Because the query can be received from other load balancers 110, it should be understood that this example is illustrative, and therefore should not be construed as being limiting in any way.

The query received in operation 302 can include a query and a command. The query can request identification of a path associated with a packet 108, while the command portion can instruct the load balancer 110C that receives the query to insert an entry in its distributed hash table portion 114C if an entry for the path does not already exist in the distributed hash table portion 114C. In other words, if the packet 108 is associated with a new flow that is not represented by the distributed hash table portion 114C stored by the receiving load balancer 110C (the load balancer 110 that received the packet 108), the receiving load balancer 110C can be configured to insert an entry for the path in the distributed hash table portion 114C stored by the receiving load balancer 110C.

Thus, the term "query," when used herein and in the claims as a noun refers to data that includes at least two data elements. Namely, a first data element of the query includes or corresponds to a request to identify information that is being requested. A second data element of the query includes or corresponds to a command to insert an entry in a distributed hash table portion 114 stored by the load balancer 110 that receives the query if the entry requested does not exist in the distributed hash table portion 114 stored by the load balancer 110 that receives the query.

From operation 302, the method 300 can proceed to operation 304. At operation 304, the load balancer 110C can query the distributed hash table portion 114C stored by the load balancer 110C that received the query in operation 302. According to various embodiments, the load balancer 110C can determine if an entry that corresponds to a hash value associated with the packet 108 exists in the distributed hash table portion 114C stored by the load balancer 110C. If the distributed hash table portion 114C stored by the load balancer 110C includes an entry that corresponds to the hash value associated with the packet 108, the load balancer 110C can retrieve the entry. The entry can identify, inter alia, a path associated with the packet 108. It should be understood that this example is illustrative, and therefore should not be construed as being limiting in any way.

From operation 304, the method 300 can proceed to operation 306. At operation 306, the load balancer 110C can generate a response to the query received in operation 302. The response generated in operation 306 can correspond to an entry in the distributed hash table portion 114C, as explained above with reference to operation 304. The response also can indicate ownership of the path, in some embodiments. Thus, the response generated in operation 306 can include, among other things, data that identifies a path associated with the packet 108 and also can indicate, in some embodiments, ownership of the path. In some embodiments, the data corresponds to an entry and therefore can be inserted by a receiving load balancer 110 (e.g., the load balancer 110A or 110B in FIGS. 1A-1D) into a distributed hash table portion 114 (e.g., the distributed hash table portion 114A or 114B) stored by the receiving load balancer 110. Because the response can be formatted in additional and/or alternative manners, it should be understood that this example is illustrative, and therefore should not be construed as being limiting in any way.

From operation 306, the method 300 can proceed to operation 308. At operation 308, the load balancer 110C can send the response to the load balancer 110 from which the query was received in operation 302 (e.g., the load balancer 110A or 110B in FIGS. 1A-1D). From operation 308, the method 300 can proceed to operation 310. The method 300 can end at operation 310.

Figure 4:
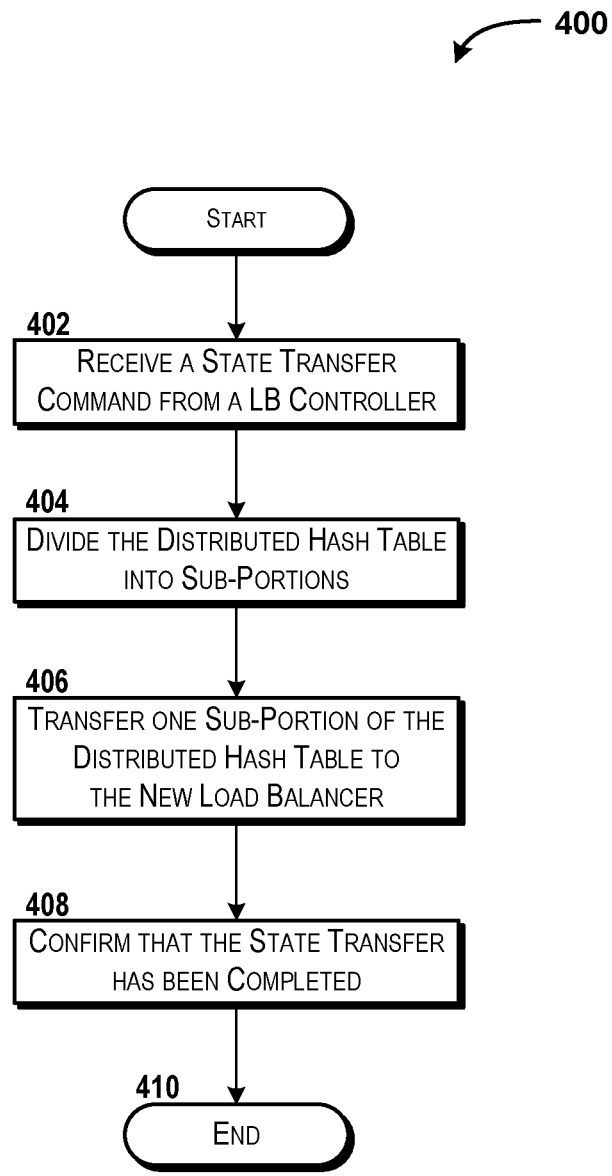
FIG. 4 is a flow diagram showing aspects of a method for updating a distributed hash table, according to an illustrative embodiment of the concepts and technologies described herein.

Turning now to FIG. 4, aspects of a method 400 for updating a distributed hash table 120 will be described in detail, according to an illustrative embodiment. For purposes of illustrating and describing the concepts of the present disclosure, the method 400 is described herein as being performed by the load balancer 110. It should be understood that additional and/or alternative devices and/or network nodes can provide the functionality described herein via execution of one or more modules, applications, and/or other software. Thus, the illustrated embodiments are illustrative, and should not be viewed as being limiting in any way.

Reference will be made in the description of the method 400 to the embodiments shown in FIGS. 1E-1G. Prior to the first operation 402 of the method 400, a computing environment 102 may be operating in a manner that is similar or even identical) to the computing environment 102 shown in FIG. 1E. As shown in this example, the computing environment 102 can include three load balancers 110A-C, and a new load balancer 110D can be added at some time. As explained above with reference to FIGS. 1A-1G, various implementations of the concepts and technologies disclosed herein include two load balancers 110, three load balancers 110, and/or more than three load balancers 110. Thus, the illustrated and described example embodiment should be understood as being illustrative and should not be construed as being limiting in any way. In response to detecting instantiation of this new load balancer 110D, the load balancer controller 118 can send a state transfer command to the load balancer 110C. It can be appreciated that more than one state transfer command can be sent in accordance with various embodiments of the concepts and technologies disclosed herein, and as such the illustrated embodiment is illustrative and should not be construed as being limiting in any way.

At some time before a state transfer occurs, it can be appreciated that the three previously existing load balancers 110A-C (e.g., the load balancers 110 that were running before a new load balancer 110 was added) of the example embodiment being described can collectively host the entire distributed hash table 120. Furthermore, it can be appreciated that the load balancer 110D being added in this example embodiment can host no distributed hash table portion 114 at the time the load balancer 110D is instantiated. Again, it must be understood that any number of nodes (e.g., load balancers 110) may collectively host the distributed hash table 120.

In the example embodiment illustrated in FIG. 1E, the load balancer 110A can host a first distributed hash table portion 114A; the load balancer 110B can host a first distributed hash table portion 114B; and the load balancer 110C can host a first distributed hash table portion 114C. The first distributed hash table portion 114A can include data associated with a first range of hash keys; the second distributed hash table portion 114B can include data associated with a second range of hash keys; and the third distributed hash table portion 114C can include data associated with a third range of hash keys. For example, the first range can be defined as {K1-K100}, meaning entries with key values from 1-100 can be included in and/or represented by data stored by the load balancer 110A as the first distributed hash table portion 114A. Similarly, the second range can be defined as {K101-K200}, meaning entries with key values from 101-200 can be represented in the data stored by the load balancer 110B as the second distributed hash table portion 114B. Similarly, the third range can be defined as {K201-K300}, meaning entries with key values from 201-300 can be represented in the data stored by the load balancer 110C as the third distributed hash table portion 114C. It should be understood that this example is illustrative, and therefore should not be construed as being limiting in any way.

The method 400 begins at operation 402. At operation 402, a load balancer such as the load balancer 110C shown in FIG. 1E can receive a state transfer command from a load balancer controller 118 or other device that can control the two or more load balancers 110 of a particular implementation of the computing environment 102. According to various embodiments, the state transfer command received in operation 402 can be generated by the load balancer controller 118 (or other entity) in response to a scaling event.

The scaling event can correspond to the scaling of a load balancing function and/or of servers of a computing environment (e.g., the adding of a new instance of a load balancer 110). Because embodiments of the concepts and technologies disclosed herein can use a distributed hash table 120, with portions of the distributed hash table 120 being stored across multiple nodes such as the load balancers 110 as the distributed hash table portions 114, it can be appreciated that introduction of a new instance of a load balancer such as the load balancer 110D can prompt the load balancer controller 118 to re-divide and/or to redistribute the distributed hash table 120 across the load balancers 110 (including the newly added load balancer such as the load balancer 110D), or to initiate the re-division and/or redistribution of the distributed hash table 120. Thus, embodiments of the concepts and technologies disclosed herein can include functionality for the load balancer controller 118 sending state transfer commands to one or more load balancers 110 to effect redistribution of the distributed hash table 120. Thus, operation 402 can correspond to this state transfer command being received by one of the previously existing load balancers 110 such as the load balancer 110C in the example shown in FIG. 1E. It should be understood that this example is illustrative, and therefore should not be construed as being limiting in any way.

From operation 402, the method 400 can proceed to operation 404. At operation 404, the load balancer 110 that received the state transfer command in operation 402 (e.g., the load balancer 110C in the example shown in FIG. 1E) can divide a distributed hash table portion 114 (e.g., the distributed hash table portion 114C in the example shown in FIG. 1E) stored by that load balancer 110 into two or more portions. As explained above, in the embodiment illustrated and described herein, the third range associated with the distributed hash table portion 114C stored by the load balancer 110C can be defined as {K201-K300}, meaning entries with key values from 201-300 are represented in the data stored by the load balancer 110C in the third distributed hash table portion 114C. It should be understood that this example is illustrative, and therefore should not be construed as being limiting in any way.

In this example embodiment, the load balancer 110 that receives the state transfer command (e.g., the load balancer 110C) can be configured to divide its distributed hash table portion 114C into two equal or unequal portions. For example, the load balancer 110C can divide the distributed hash table portion 114C into two sub-portions of the distributed hash table (hereinafter collectively and/or generically referred to as "sub-portions") 122A and 122B. The first sub-portion 122A can have a sub-range defined, for example, as {K201-K250}, meaning entries with key values from 201-250 can be included in the first sub-portion 122A. This example embodiment is illustrated in FIG. 1F.

The second sub-portion 122B can have a sub-range defined, for example, as {K251-K300}, meaning entries with key values from 251-300 can be included in the second sub-portion 122B. It should be understood that these example sub-portions are illustrative, and therefore should not be construed as being limiting in any way. In particular, the distributed hash table portion 114C stored by the load balancer 110C (or any other load balancer 110 that receives a state transfer command) can be divided into any number (two or more) sub-portions such as the sub-portions 122A and 122B.

From operation 404, the method 400 can proceed to operation 406. At operation 406, the load balancer 110 that divided its distributed hash table portion 114 (e.g., the load balancer 110C in the example shown in FIGS. 1E-1F) into sub-portions in operation 404 can transfer one sub-portion to the newly instantiated load balancer 110 (e.g., the load balancer 110D as shown in the example in FIGS. 1E-1F). It can be appreciated that the load balancer 110 (e.g., the load balancer 110C in the example shown in FIGS. 1E-1F) can maintain one of the sub-portions created in operation 404 for itself.

From operation 406, the method 400 can proceed to operation 408. In operation 408, the load balancer 110 that transferred a sub-portion of its distributed hash table portion 114 (e.g., the load balancer 110C in the example shown in FIGS. 1E-1F) to the newly instantiated load balancer 110 (e.g., the load balancer 110D as shown in the example in FIGS. 1E-1F) can confirm that the state transfer has been completed. In some embodiments, the load balancer 110C can send a confirmation to the load balancer controller 118 to confirm that this operation has been completed. It should be understood that this example is illustrative, and therefore should not be construed as being limiting in any way.

As shown in FIG. 1F, the load balancer controller 118 can be configured to inform the other load balancers 110 of the newly added load balancer 110D, as well as details of the new distribution and/or division of the distributed hash table 120 across the load balancers 110. Thus, the load balancers 110 can be updated so that the load balancers 110 will have a current knowledge of how the key ranges are associated with each of the now-existing load balancers 110. Thus, each load balancer 110 can know which of the load balancers 110 to query when a new packet 108 is received. It should be understood that this example is illustrative, and therefore should not be construed as being limiting in any way.

From operation 408, the method 400 can proceed to operation 410. The method 400 can end at operation 410.

Figure 5:
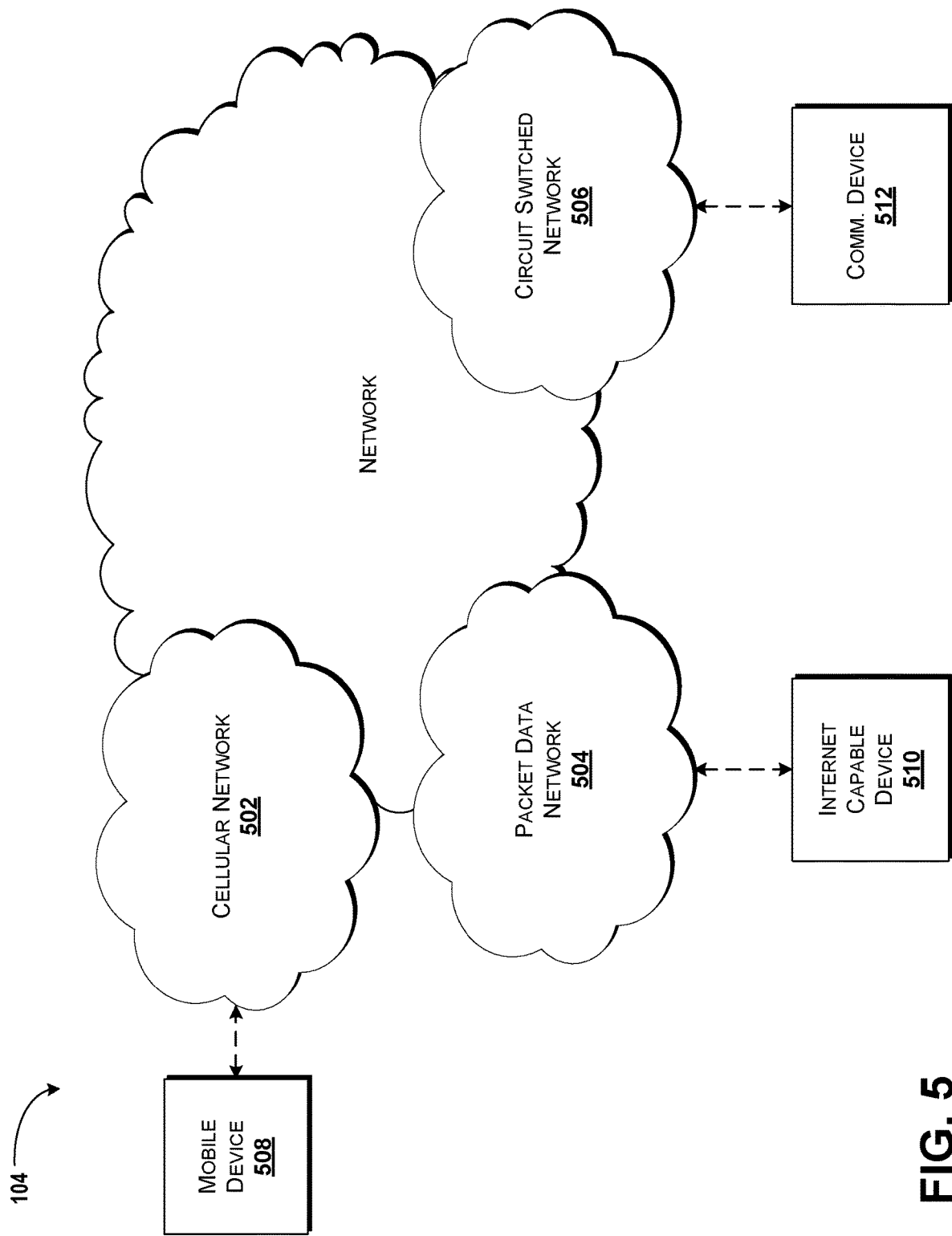
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
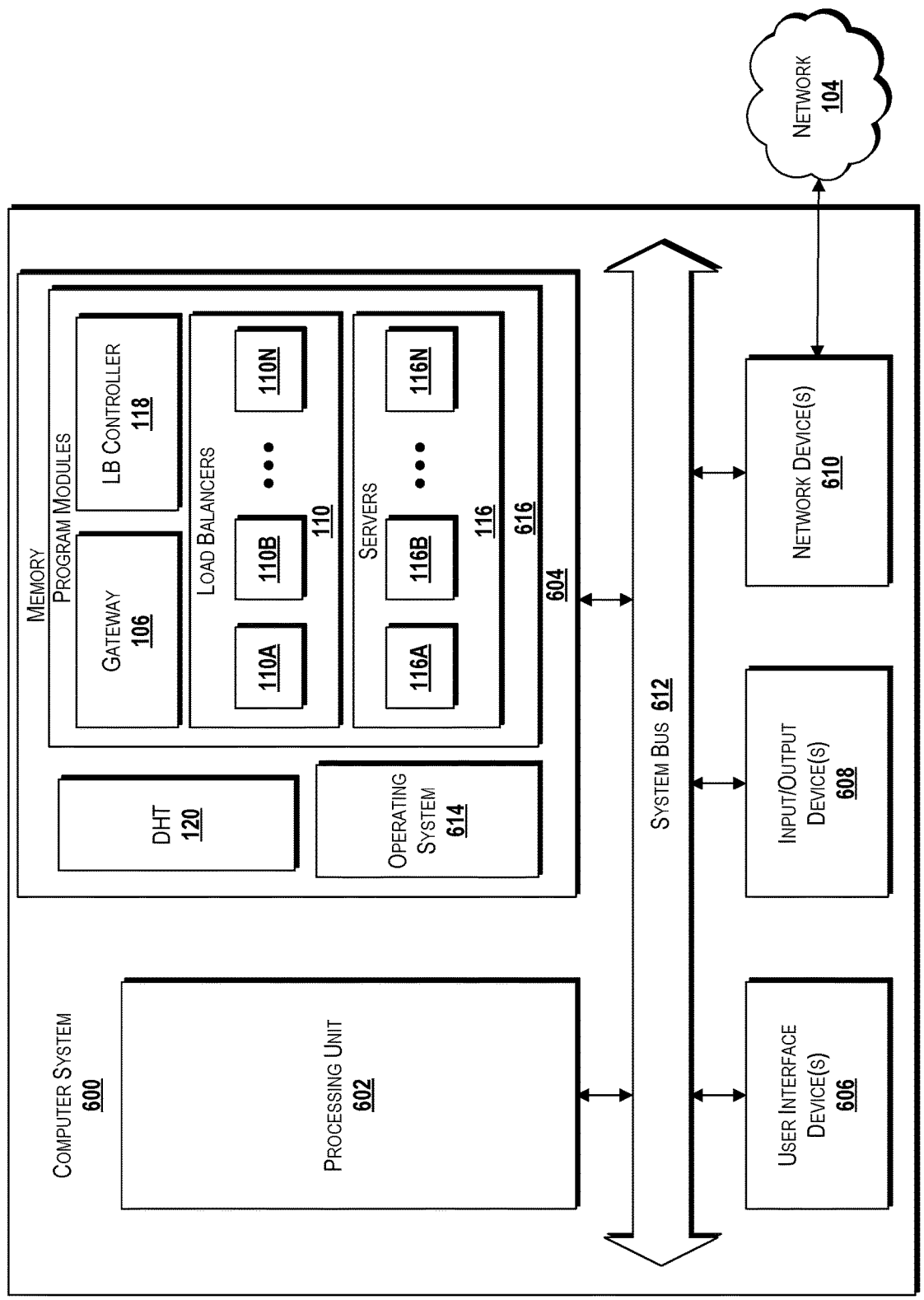
FIG. 6 is a block diagram illustrating an example computer system configured to provide a distributed stateful load balancer, according to some illustrative embodiments of the concepts and technologies described herein.

FIG. 6 is a block diagram illustrating a computer system 600 configured to provide the functionality described herein for a distributed stateful load balancer, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the gateway 106, the load balancers 110, the servers 116, and the load balancer controller 118. These and/or other modules and/or programs can be embodied in computer-readable media containing instructions that, when executed by the processing unit 602, perform one or more of the methods 200, 300, and 400 described in detail above with respect to FIGS. 2-4 and/or other functionality as illustrated and described herein. It can be appreciated that, at least by virtue of the instructions embodying the methods 200, 300, 400, and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store packets 108, hash values, the caches 112 and/or data associated therewith, one or more of the distributed hash table portions 114, queries and/or responses, state transfer commands, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing a distributed stateful load balancer have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
   a processor; and
   a memory that stores computer-executable instructions that, when executed by the processor, cause the processor to perform operations comprising
      storing, by a first load balancer that is in communication with a second load balancer, a first portion of a distributed hash table, wherein the first portion of the distributed hash table comprises a first range of hash keys, and wherein a second portion of the distributed hash table that comprises a second range of hash keys is stored at the second load balancer,
      receiving, by the first load balancer, a packet,
      obtaining, by the first load balancer, a hash value associated with the packet, wherein the hash value does not fall in the first range of hash keys,
      determining, by the first load balancer and based on the hash value, that the second load balancer stores data that identifies a path associated with the packet,
      obtaining, by the first load balancer and from the second load balancer, the data that identifies the path, and
      forwarding, by the first load balancer and directed to a destination network element associated with the path, the packet.

2. The system of claim 1, wherein the computer-executable instructions, when executed by the processor, cause the processor to perform operations further comprising:
   storing, in a cache associated with the first load balancer, the data that identifies the path;
   receiving, from the destination network element, a subsequent packet;
   determining, based on the cache, a reverse path associated with the subsequent packet; and
   forwarding, along the reverse path, the subsequent packet.

3. The system of claim 1, wherein the computer-executable instructions, when executed by the processor, cause the processor to perform operations further comprising:
   receiving a state transfer command from a load balancer controller; and
   in response to receiving the state transfer command,
      dividing the first portion of the distributed hash table into a first sub-portion comprising a third range of hash keys and a second sub-portion comprising a fourth range of hash keys, and
      sending, directed to a new load balancer, the first sub-portion.

4. The system of claim 3, wherein the load balancer controller is configured to send an update to the second load balancer, the update indicating that the first sub-portion comprising the third range of hash keys is located at the new load balancer.

5. The system of claim 1, wherein the computer-executable instructions, when executed by the processor, cause the processor to perform operations further comprising:
   receiving a query from a third load balancer, the query comprising a request to identify a further path associated with a further packet.

6. The system of claim 5, wherein the computer-executable instructions, when executed by the processor, cause the processor to perform operations further comprising:
   determining that further data identifying the further path associated with the further packet is not stored at the first load balancer; and
   inserting, into the first portion of the distributed hash table, an entry that defines the further path, wherein the further path is identified in the query.

7. A method comprising:
   storing, by a first load balancer comprising a cache, a first portion of a distributed hash table, wherein the first portion of the distributed hash table comprises a first range of hash keys, wherein the first load balancer is in communication with a second load balancer, and wherein a second portion of the distributed hash table that comprises a second range of hash keys is stored at the second load balancer;
   receiving, by the first load balancer, a packet,
   obtaining, by the first load balancer, a hash value associated with the packet, wherein the hash value does not fall in the first range of hash keys;
   determining, by the first load balancer and based on the hash value, that the second load balancer stores data that identifies a path associated with the packet;
   obtaining, by the first load balancer and from the second load balancer, the data that identifies the path; and forwarding, by the first load balancer and directed to a destination network element associated with the path, the packet.

8. The method of claim 7, further comprising:
storing, by the first load balancer and in the cache, the data that identifies the path;
receiving, by the first load balancer and from the destination network element, a subsequent packet;
determining, by the first load balancer and based on the cache, a reverse path associated with the subsequent packet; and
forwarding, by the first load balancer and along the reverse path, the subsequent packet.

9. The method of claim 8, wherein the data that identifies the path comprises a distributed hash table entry, wherein the distributed hash table entry is based on a data entry in the second portion of the distributed hash table.

10. The method of claim 7, further comprising:
receiving, by the first load balancer, a state transfer command from a load balancer controller; and
in response to receiving the state transfer command,
dividing, by the first load balancer, the first portion of the distributed hash table into a first sub-portion comprising a third range of hash keys and a second sub-portion comprising a fourth range of hash keys, and
sending, by the first load balancer and directed to a new load balancer, the first sub-portion.

11. The method of claim 10, further comprising:
sending, to the load balancer controller, a state transfer confirmation, wherein the load balancer controller is configured to send an update to the second load balancer, the update indicating that the first sub-portion comprising the third range of hash keys is located at the new load balancer.

12. The method of claim 7, further comprising:
receiving, by the first load balancer, a query from a third load balancer, the query comprising a request to identify a further path associated with a further packet.

13. The method of claim 12, further comprising:
determining that further data identifying the further path associated with the further packet is not stored at the first load balancer; and
inserting, into the first portion of the distributed hash table, an entry that that defines the further path, wherein the further path is identified in the query.

14. A computer storage medium having computer-executable instructions stored thereon that, when executed by a processor, cause the processor to perform operations comprising:
storing, by a first load balancer that is in communication with a second load balancer, a first portion of a distributed hash table, wherein the first portion of the distributed hash table comprises a first range of hash keys, and wherein a second portion of the distributed hash table that comprises a second range of hash keys is stored at the second load balancer;
receiving, by the first load balancer, a packet,
obtaining, by the first load balancer, a hash value associated with the packet, wherein the hash value does not fall in the first range of hash keys;
identifying, by the first load balancer and based on the hash value, that the second load balancer stores data that identifies a path associated with the packet;
obtaining, by the first load balancer and from the second load balancer, the data that identifies the path; and
forwarding, by the first load balancer and directed to a destination network element associated with the path, the packet.

15. The computer storage medium of claim 14, wherein the computer-executable instructions, when executed by the processor, cause the processor to perform operations further comprising:
storing, in a cache associated with the first load balancer, the data that identifies the path;
receiving, from the destination network element, a subsequent packet;
determining, based on the cache, a reverse path associated with the subsequent packet; and
forwarding, along the reverse path, the subsequent packet.

16. The computer storage medium of claim 15, wherein the data that identifies the path comprises a distributed hash table entry, wherein the distributed hash table entry is based on a data entry in the second portion of the distributed hash table.

17. The computer storage medium of claim 14, wherein the computer-executable instructions, when executed by the processor, cause the processor to perform operations further comprising:
receiving a state transfer command from a load balancer controller; and
in response to receiving the state transfer command,
dividing the first portion of the distributed hash table into a first sub-portion comprising a third range of hash keys and a second sub-portion comprising a fourth range of hash keys, and
sending, directed to a new load balancer, the first sub-portion.

18. The computer storage medium of claim 17, wherein the load balancer controller is configured to send an update to the second load balancer, the update indicating that the first sub-portion comprising the third range of hash keys is located at the new load balancer.

19. The computer storage medium of claim 14, wherein the computer-executable instructions, when executed by the processor, cause the processor to perform operations further comprising:
receiving a query from a third load balancer, the query comprising a request to identify a further path associated with a further packet.

20. The computer storage medium of claim 19, wherein the computer-executable instructions, when executed by the processor, cause the processor to perform operations further comprising:
determining that further data identifying the further path associated with the further packet is not stored at the first load balancer; and
inserting, into the first portion of the distributed hash table, an entry that that defines the further path, wherein the further path is identified in the query.

* * * * *